Oct. 16, 1951 G. A. SCHINDLER 2,571,491
SEED TAPE
Filed Dec. 20, 1948
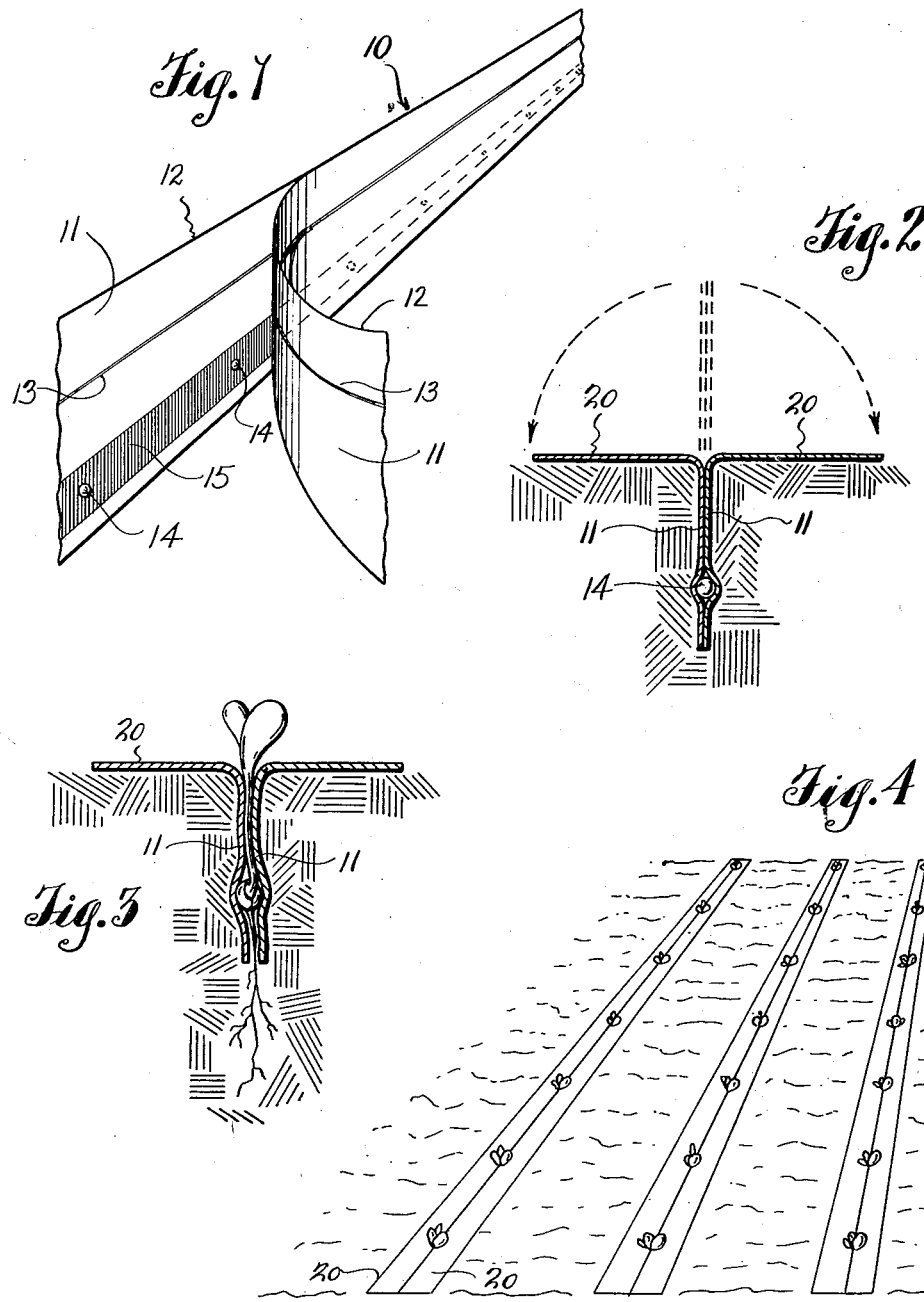
Inventor
GEORGE A. SCHINDLER Patented Oct. 16, 1951

2,571,491

UNITED STATES PATENT OFFICE 2,571,491

SEED TAPE

George Anthony Schindler, Tacoma, Wash.

Application December 20, 1948, Serial No. 66,362

2 Claims. (Cl. 47—56)

This invention relates to seed tapes and more particularly to seed tapes of that character wherein the seeds are held in spaced relationship for planting between strips of paper or the like.

The principal object of this invention is to provide an improved form of seed tape for the scientific and systematic planting of seeds to avoid waste of seeds, to prevent overcrowding of plants and to insure the planting of seeds at a predetermined and proper depth.

Another object of this invention is to provide a seed tape that protects the contained seeds against worms, insects and the like, and eliminates the growth of weeds or other plants in the area immediately surrounding the planted seeds and plants that result therefrom during the early stages of their growth.

Another object of this invention is to so form the tape that when properly applied to the ground, it will gauge the planting of the seeds at the most desirable depth for that particular kind of seed.

A still further object of this invention is to provide a seed tape utilizing porous paper that is treated in a manner to be resistant to insects and fungi.

A further object of this invention is to provide a seed tape utilizing strips of paper or other suitable material that will absorb water only to limited extent and will disintegrate into fertilizer after it has served its purpose.

In accomplishing the above mentioned and other objects of this invention, I have provided the improved details of construction, the preferred forms of which are illustrated in the accompanying drawings, wherein:

Fig. 1 is a perspective view of a short portion of the seed tape, showing the two strips pulled apart to better illustrate the disposed seeds, and the glue band of uniform width that unites the strips.

Fig. 2 is a cross-sectional view of the tape disposed in the ground.

Fig. 3 is a similar view illustrating the early growth of a plant from the seed.

Fig. 4 is a perspective view of seed tapes laid in the ground, illustrating the protected areas at each side of the plant rows.

Referring more in detail to the drawings:

In Fig. 1 I have illustrated a short length of my seed tape and have designated it in its entirety numeral 10. The tape is formed from two similar strips of porous, non-absorbing paper, 11—11. The width of strips and weight of the paper may vary as desired or required. The preferred standard width would be approximately five inches but might be less for seeds that are planted close to the surface. Each strip of paper is longitudinally scored at a predetermined distance from the upper edge 12 of approximately one inch. In Fig. 1, score lines are designated by numerals 13. The purpose of this scoring will be presently set forth in full. The length of the strips may vary according to their most practical usage. For example, they may be manufactured in strips of one hundred feet and may be readily cut to be used in planting shorter rows of seeds.

Between the registered paper strips, the seeds 14 are disposed and held in a secured position in a glue band or strip 15 which also unites the strips of paper to form the seed tape. The point or position at which the seeds are secured to the strips is in accordance with and determined by the knowledge of the most satisfactory depth at which the particular seeds should be planted in the ground. The preferred depth for planting of those particular seeds that are applied to the tape is measured downwardly from the scored lines 13 and the seeds are disposed in uniform spacing and at the designated planting depth from the scoring. Small seeds, such as onion seeds, would be disposed relatively close to the scored lines, whereas larger seeds, such as those for peas or beans, would be farther away from the scored line and closer to the bottom edge of the strip.

The seeds as disposed along the tape are spaced at the most satisfactory growing distance. This spacing generally will be uniform and will be based on predetermined factors as to what is to the most beneficial spacial relationship for all conditions of growth or production from the plant. This spacing along the tape would vary for different kinds or types of seeds and plants.

To economically produce seed tapes of this kind, it is anticipated that one strip would be run through a machine whereby the line of scoring and glue band or strip would be simultaneously applied thereto. Then in the same machine a seed dropper would be incorporated, to drop the seeds onto the glue band at a predetermined spacing. Then the other strip would be brought into a position registered with the first strip and pressed thereagainst so that the glue band would serve also to unite the strips. Adjustments in the machine would be provided for to make possible a change in the distance of the score line from the top edge of the tape, the distance of glue band for the scoring and the spacing of the seeds as applied to the glue band The seeds, so disposed between the parallel strips, are ready for planting. A slit trench or furrow is formed in the ground to a desired or required depth and the seed tape is projected edgewise into the slit or furrow, and the soil pressed against its opposite sides. The upper edge portion of the tape extends from the ground, with the lines of scoring 13 substantially at the level of the surface. The edge portions of the strip are then folded back, away from each other, along the scored lines 13 at right angles to the portion of the strips planted in the ground. These upper portions of the tape, designated at 20—20 in Figs. 2 and 4, are intended to lie flatly on the ground surface. In this position they provide protected areas on each side of the seed row. This protection afforded the seeds and plants that result therefrom retards or restricts the growth of weeds or other plants in the immediate vicinity. Thus the new plant has a greater opportunity to develop, especially in the early stages of its growth.

The seeds which are contained in the seed tape may be of any common types which are ordinarily used to plant vegetables, flowers or trees. No special kind of seeds is required and the tapes may be used for planting all varieties of seeds.

The paper from which the tape is formed should be porous and of relative light weight. A sixteen-pound sulphite paper is preferred. The paper should not be overly absorbent as too much moisture therein will cause the seeds to rot. It is also intended that the paper shall be impregnated with insecticides and fertilizers so as to give added protection to the seeds and new plants and to promote their growth and development. Also, the paper should be of such character as to disintegrate after it has served its purpose.

The glue or bond which is utilized in securing the seeds in the desired position and for bonding the strips together should be a resinous glue, or of other kind which is not injurious to the seeds and yet capable of adequately performing its bonding function.

Having thus described my invention, what I claim as new therein and desire to secure by Letters Patent is:

1. A seed tape comprising coextensive, registered strips of material that will readily disintegrate in the soil, a glue band of uniform width extending longitudinally of and joining the said strips at a uniform distance from its longitudinal edges, and seeds disposed in uniformly spaced relationship in the glue band; and each of said strips being longitudinally scored between the glue band and top edge of the tape to establish lines along which the top edges of said strips may be outwardly folded.

2. A seed tape of the character described adapted to be disposed on edge in a planting trench comprising two coextensive strips of paper bonded together by a glue band of uniform width in the lower portion thereof and having seeds disposed in the glue between the strips, each of said strips being longitudinally scored at the same level between the upper edge thereof and the glue band to provide lines along which the upper portions of the strips may be outwardly folded thereby determining the depth of planting and forming a seed protective area.

GEORGE ANTHONY SCHINDLER.

REFERENCES CITED

The following references are of record in the file of this patent:

UNITED STATES PATENTS

| Number | Name | Date |
| --- | --- | --- |
| 1,160,279 | Gray | Nov. 16, 1915 |
| 1,143,980 | McComb | June 22, 1915 |